(12) United States Patent
Maclean et al.

(10) Patent No.: US 10,956,508 B2
(45) Date of Patent: Mar. 23, 2021

(54) SYSTEMS AND METHODS FOR CREATING AND MANAGING A DATA INTEGRATION WORKSPACE CONTAINING AUTOMATICALLY UPDATED DATA MODELS

(71) Applicant: Palantir Technologies Inc., Palo Alto, CA (US)

(72) Inventors: Matthew Maclean, New York, NY (US); Adam Borochoff, New York, NY (US); Joseph Rafidi, Mountain View, CA (US); Matthew Jenny, San Francisco, CA (US); Parvathy Menon, San Jose, CA (US); Ryan Rowe, Portola Valley, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 73 days.

(21) Appl. No.: 15/956,600

(22) Filed: Apr. 18, 2018

(65) Prior Publication Data

US 2019/0147114 A1    May 16, 2019

Related U.S. Application Data

(60) Provisional application No. 62/584,665, filed on Nov. 10, 2017.

(51) Int. Cl.
*G06F 16/904* (2019.01)
*G06T 11/20* (2006.01)
(Continued)

(52) U.S. Cl.
CPC .......... *G06F 16/904* (2019.01); *G06F 3/0484* (2013.01); *G06F 16/21* (2019.01);
(Continued)

(58) Field of Classification Search
CPC ............ G06F 17/30994; G06F 3/0484; G06F 17/30002; G06F 21/604; G06T 11/206
(Continued)

(56) References Cited

U.S. PATENT DOCUMENTS

| 4,881,179 A | 11/1989 | Vincent |
| 5,241,625 A | 8/1993 | Epard et al. |

(Continued)

FOREIGN PATENT DOCUMENTS

| AU | 2013251186 | 11/2015 |
| CA | 2666364 | 1/2015 |

(Continued)

OTHER PUBLICATIONS

"A Tour of Pinboard," <http://pinboard.in/tour> as printed May 15, 2014 in 6 pages.

(Continued)

*Primary Examiner* — Alicia M Antoine
(74) *Attorney, Agent, or Firm* — Sheppard Mullin Richter & Hampton LLP

(57) ABSTRACT

Systems and methods are provided for creating and managing a data integration workspace. The workspace may comprise one or more views of data (or datasets) stored in or accessible by the system. Models may be generated and updated based on the plurality of datasets and presented via a graphical user interface. Feedback received via a graphical user interface presenting a model may be used to annotate an underlying dataset associated with the model. Responsive to a modification of the underlying dataset or the rules for using the underlying dataset to generate the model, other related datasets and/or models may be automatically updated accordingly. Templates associated with one or more types of users may be defined. Each template may comprise one or more specific models related to a specific type of user.

14 Claims, 6 Drawing Sheets

(51) Int. Cl.
*G06F 3/0484* (2013.01)
*G06F 21/60* (2013.01)
*G06F 16/23* (2019.01)
*G06F 16/21* (2019.01)

(52) U.S. Cl.
CPC ............ *G06F 16/23* (2019.01); *G06F 21/604* (2013.01); *G06T 11/206* (2013.01)

(58) Field of Classification Search
USPC ........................................................ 707/769
See application file for complete search history.

(56) References Cited

U.S. PATENT DOCUMENTS

| | | |
|---|---|---|
| 5,414,809 A | 5/1995 | Hogan et al. |
| 5,845,300 A | 12/1998 | Comer |
| 5,999,911 A | 12/1999 | Berg et al. |
| 6,065,026 A | 5/2000 | Cornelia et al. |
| 6,101,479 A | 8/2000 | Shaw |
| 6,232,971 B1 | 5/2001 | Haynes |
| 6,237,138 B1 | 5/2001 | Hameluck et al. |
| 6,243,706 B1 | 6/2001 | Moreau et al. |
| 6,279,018 B1 | 8/2001 | Kudrolli et al. |
| 6,289,338 B1 | 9/2001 | Stoffel et al. |
| 6,370,538 B1 | 4/2002 | Lamping et al. |
| 6,430,305 B1 | 8/2002 | Decker |
| 6,463,404 B1 | 10/2002 | Appleby |
| 6,523,019 B1 | 2/2003 | Borthwick |
| 6,523,172 B1 | 2/2003 | Martinez-Guerra et al. |
| 6,539,538 B1 | 3/2003 | Brewster et al. |
| 6,640,231 B1 | 10/2003 | Andersen et al. |
| 6,642,945 B1 | 11/2003 | Sharpe |
| 6,665,683 B1 | 12/2003 | Meltzer |
| 6,748,481 B1 | 6/2004 | Parry et al. |
| 6,850,317 B2 | 2/2005 | Mullins et al. |
| 6,877,137 B1 | 4/2005 | Rivette et al. |
| 6,944,777 B1 | 9/2005 | Belani et al. |
| 6,944,821 B1 | 9/2005 | Bates et al. |
| 6,967,589 B1 | 11/2005 | Peters |
| 6,978,419 B1 | 12/2005 | Kantrowitz |
| 7,027,974 B1 | 4/2006 | Busch et al. |
| 7,086,028 B1 | 8/2006 | Davis et al. |
| 7,089,541 B2 | 8/2006 | Ungar |
| 7,174,377 B2 | 2/2007 | Bernard et al. |
| 7,194,680 B1 | 3/2007 | Roy et al. |
| 7,213,030 B1 | 5/2007 | Jenkins |
| 7,237,192 B1 | 6/2007 | Stephenson et al. |
| 7,240,330 B2 | 7/2007 | Fairweather |
| 7,392,254 B1 | 6/2008 | Jenkins |
| 7,441,182 B2 | 10/2008 | Beilinson et al. |
| 7,441,219 B2 | 10/2008 | Perry et al. |
| 7,533,069 B2 | 5/2009 | Fairweather |
| 7,627,812 B2 | 12/2009 | Chamberlain et al. |
| 7,634,717 B2 | 12/2009 | Chamberlain et al. |
| 7,685,083 B2 | 3/2010 | Fairweather |
| 7,716,140 B1 | 5/2010 | Nielsen et al. |
| 7,765,489 B1 | 7/2010 | Shah |
| 7,770,100 B2 | 8/2010 | Chamberlain et al. |
| 7,877,421 B2 | 1/2011 | Berger et al. |
| 7,880,921 B2 | 2/2011 | Dattilo et al. |
| 7,941,336 B1 | 5/2011 | Robin-Jan |
| 7,958,147 B1 | 6/2011 | Turner et al. |
| 7,962,495 B2 | 6/2011 | Jain et al. |
| 7,962,848 B2 | 6/2011 | Bertram |
| 7,966,199 B1 | 6/2011 | Frasher |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,073,857 B2 | 12/2011 | Sreekanth |
| 8,117,022 B2 | 2/2012 | Linker |
| 8,132,149 B2 | 3/2012 | Shenfield et al. |
| 8,191,005 B2 | 5/2012 | Baier et al. |
| 8,225,201 B2 | 7/2012 | Michael |
| 8,271,948 B2 | 9/2012 | Talozi et al. |
| 8,290,838 B1 | 10/2012 | Thakur et al. |
| 8,302,855 B2 | 11/2012 | Ma et al. |
| 8,312,367 B2 | 11/2012 | Foster |
| 8,332,354 B1 | 12/2012 | Chatterjee et al. |
| 8,392,556 B2 | 3/2013 | Goulet et al. |
| 8,418,085 B2 | 4/2013 | Snook et al. |
| 8,489,623 B2 | 7/2013 | Jain et al. |
| 8,527,949 B1 | 9/2013 | Pleis et al. |
| 8,560,494 B1 | 10/2013 | Downing |
| 8,620,641 B2 | 12/2013 | Farnsworth et al. |
| 8,682,696 B1 | 3/2014 | Shanmugam |
| 8,688,573 B1 | 4/2014 | Ruknoic et al. |
| 8,689,182 B2 | 4/2014 | Leithead et al. |
| 8,732,574 B2 | 5/2014 | Burr et al. |
| 8,799,313 B2 | 8/2014 | Satlow |
| 8,807,948 B2 | 8/2014 | Luo et al. |
| 8,855,999 B1 | 10/2014 | Elliot |
| 8,903,717 B2 | 12/2014 | Elliot |
| 8,930,874 B2 | 1/2015 | Duff et al. |
| 8,930,897 B2 | 1/2015 | Nassar |
| 8,938,686 B1 | 1/2015 | Erenrich et al. |
| 8,984,390 B2 | 3/2015 | Aymeloglu et al. |
| 9,009,827 B1 | 4/2015 | Albertson et al. |
| 9,058,315 B2 | 6/2015 | Burr et al. |
| 9,165,100 B2 | 10/2015 | Begur et al. |
| 9,201,920 B2 | 12/2015 | Jain et al. |
| 9,223,773 B2 | 12/2015 | Isaacson |
| 9,229,952 B1 | 1/2016 | Meacham et al. |
| 9,286,373 B2 | 3/2016 | Elliot et al. |
| 9,348,880 B1 | 5/2016 | Kramer et al. |
| 2001/0021936 A1 | 9/2001 | Bertram |
| 2002/0032677 A1 | 3/2002 | Morgenthaler et al. |
| 2002/0095360 A1 | 7/2002 | Joao |
| 2002/0103705 A1 | 8/2002 | Brady |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0061132 A1 | 3/2003 | Mason et al. |
| 2003/0074187 A1 | 4/2003 | Ait-Mokhtar et al. |
| 2003/0093755 A1 | 5/2003 | O'Carroll |
| 2003/0126102 A1 | 7/2003 | Borthwick |
| 2003/0172053 A1 | 9/2003 | Fairweather |
| 2003/0177112 A1 | 9/2003 | Gardner |
| 2004/0034570 A1 | 2/2004 | Davis |
| 2004/0044648 A1 | 3/2004 | Anfindsen et al. |
| 2004/0044992 A1 | 3/2004 | Muller et al. |
| 2004/0078451 A1 | 4/2004 | Dietz et al. |
| 2004/0083466 A1 | 4/2004 | Dapp et al. |
| 2004/0205492 A1 | 10/2004 | Newsome |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0260702 A1 | 12/2004 | Cragun et al. |
| 2005/0010472 A1 | 1/2005 | Quatse et al. |
| 2005/0028094 A1 | 2/2005 | Allyn |
| 2005/0039116 A1 | 2/2005 | Slack-Smith |
| 2005/0039119 A1 | 2/2005 | Parks et al. |
| 2005/0091186 A1 | 4/2005 | Elish |
| 2005/0091420 A1 | 4/2005 | Snover et al. |
| 2005/0125715 A1 | 6/2005 | Di Franco et al. |
| 2005/0183005 A1 | 8/2005 | Denoue et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0074866 A1 | 4/2006 | Chamberlain et al. |
| 2006/0080139 A1 | 4/2006 | Mainzer |
| 2006/0129746 A1 | 6/2006 | Porter |
| 2006/0136513 A1 | 6/2006 | Ngo et al. |
| 2006/0143075 A1 | 6/2006 | Carr et al. |
| 2006/0155654 A1 | 7/2006 | Plessis et al. |
| 2006/0178915 A1 | 8/2006 | Chao |
| 2006/0265417 A1 | 11/2006 | Amato et al. |
| 2006/0271838 A1 | 11/2006 | Carro |
| 2006/0277460 A1 | 12/2006 | Forstall et al. |
| 2007/0000999 A1 | 1/2007 | Kubo et al. |
| 2007/0018986 A1 | 1/2007 | Hauser |

(56) References Cited

U.S. PATENT DOCUMENTS

| | | |
|---|---|---|
| 2007/0043686 A1 | 2/2007 | Teng et al. |
| 2007/0061752 A1 | 3/2007 | Cory |
| 2007/0074169 A1 | 3/2007 | Chess et al. |
| 2007/0078872 A1 | 4/2007 | Cohen |
| 2007/0112714 A1 | 5/2007 | Fairweather |
| 2007/0113164 A1 | 5/2007 | Hansen et al. |
| 2007/0136095 A1 | 6/2007 | Weinstein |
| 2007/0168871 A1 | 7/2007 | Jenkins |
| 2007/0174760 A1 | 7/2007 | Chamberlain et al. |
| 2007/0185850 A1 | 8/2007 | Walters et al. |
| 2007/0233709 A1 | 10/2007 | Abnous |
| 2007/0245339 A1 | 10/2007 | Bauman et al. |
| 2007/0284433 A1 | 12/2007 | Domenica et al. |
| 2007/0299697 A1 | 12/2007 | Friedlander et al. |
| 2008/0016155 A1 | 1/2008 | Khalatian |
| 2008/0034327 A1 | 2/2008 | Cisler et al. |
| 2008/0091693 A1 | 4/2008 | Murthy |
| 2008/0109714 A1 | 5/2008 | Kumar et al. |
| 2008/0140387 A1 | 6/2008 | Linker |
| 2008/0148398 A1 | 6/2008 | Mezack et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0228467 A1 | 9/2008 | Womack et al. |
| 2008/0249820 A1 | 10/2008 | Pathria |
| 2008/0276167 A1 | 11/2008 | Michael |
| 2008/0281580 A1 | 11/2008 | Zabokritski |
| 2008/0288475 A1 | 11/2008 | Kim et al. |
| 2008/0313132 A1 | 12/2008 | Hao et al. |
| 2008/0313243 A1 | 12/2008 | Poston et al. |
| 2009/0024962 A1 | 1/2009 | Gotz |
| 2009/0031401 A1 | 1/2009 | Cudich et al. |
| 2009/0043801 A1 | 2/2009 | LeClair |
| 2009/0089651 A1 | 4/2009 | Herberger et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0150868 A1 | 6/2009 | Chakra et al. |
| 2009/0164934 A1 | 6/2009 | Bhattiprolu et al. |
| 2009/0172821 A1 | 7/2009 | Daira et al. |
| 2009/0177962 A1 | 7/2009 | Gusmorino et al. |
| 2009/0187546 A1 | 7/2009 | Whyte et al. |
| 2009/0193037 A1 | 7/2009 | Yu et al. |
| 2009/0199106 A1 | 8/2009 | Jonsson et al. |
| 2009/0216562 A1 | 8/2009 | Faulkner et al. |
| 2009/0228507 A1 | 9/2009 | Jain et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0307049 A1 | 12/2009 | Elliott et al. |
| 2009/0313463 A1 | 12/2009 | Pang et al. |
| 2009/0319891 A1 | 12/2009 | MacKinlay |
| 2010/0004857 A1 | 1/2010 | Pereira et al. |
| 2010/0011282 A1 | 1/2010 | Dollard et al. |
| 2010/0057622 A1 | 3/2010 | Faith et al. |
| 2010/0070842 A1 | 3/2010 | Aymeloglu et al. |
| 2010/0070844 A1 | 3/2010 | Aymeloglu et al. |
| 2010/0076813 A1 | 3/2010 | Ghosh et al. |
| 2010/0098318 A1 | 4/2010 | Anderson |
| 2010/0122152 A1 | 5/2010 | Chamberlain et al. |
| 2010/0204983 A1 | 8/2010 | Chung et al. |
| 2010/0223260 A1 | 9/2010 | Wu |
| 2010/0238174 A1 | 9/2010 | Haub et al. |
| 2010/0257015 A1 | 10/2010 | Molander |
| 2010/0257515 A1 | 10/2010 | Bates et al. |
| 2010/0262901 A1 | 10/2010 | DiSalvo |
| 2010/0280851 A1 | 11/2010 | Merkin |
| 2010/0306285 A1 | 12/2010 | Shah et al. |
| 2010/0306722 A1 | 12/2010 | LeHoty et al. |
| 2010/0313119 A1 | 12/2010 | Baldwin et al. |
| 2010/0313239 A1 | 12/2010 | Chakra et al. |
| 2011/0047540 A1 | 2/2011 | Williams et al. |
| 2011/0074788 A1 | 3/2011 | Regan et al. |
| 2011/0093327 A1 | 4/2011 | Fordyce, III et al. |
| 2011/0099133 A1 | 4/2011 | Chang et al. |
| 2011/0107196 A1 | 5/2011 | Foster |
| 2011/0161409 A1 | 6/2011 | Nair |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0213791 A1 | 9/2011 | Jain et al. |
| 2011/0225482 A1 | 9/2011 | Chan et al. |
| 2011/0258216 A1 | 10/2011 | Supakkul et al. |
| 2012/0004894 A1 | 1/2012 | Butler |
| 2012/0022945 A1 | 1/2012 | Falkenborg et al. |
| 2012/0059853 A1 | 3/2012 | Jagota |
| 2012/0065987 A1 | 3/2012 | Farooq et al. |
| 2012/0084117 A1 | 4/2012 | Tavares et al. |
| 2012/0084184 A1 | 4/2012 | Raleigh |
| 2012/0123989 A1 | 5/2012 | Yu et al. |
| 2012/0137235 A1 | 5/2012 | Ts et al. |
| 2012/0154402 A1* | 6/2012 | Mital ............... G06T 11/206 345/440 |
| 2012/0188252 A1 | 7/2012 | Law |
| 2012/0191446 A1 | 7/2012 | Binsztok et al. |
| 2012/0197657 A1 | 8/2012 | Prodanovic |
| 2012/0197660 A1 | 8/2012 | Prodanovic |
| 2012/0215784 A1 | 8/2012 | King et al. |
| 2012/0221553 A1 | 8/2012 | Wittmer et al. |
| 2012/0226590 A1 | 9/2012 | Love et al. |
| 2012/0266245 A1 | 10/2012 | McDougal et al. |
| 2012/0284670 A1 | 11/2012 | Kashik et al. |
| 2012/0304150 A1 | 11/2012 | Leithead et al. |
| 2012/0304244 A1 | 11/2012 | Xie et al. |
| 2012/0323829 A1 | 12/2012 | Stokes et al. |
| 2013/0016106 A1 | 1/2013 | Yip et al. |
| 2013/0024268 A1 | 1/2013 | Manickavelu |
| 2013/0055264 A1 | 2/2013 | Burr et al. |
| 2013/0086482 A1 | 4/2013 | Parsons |
| 2013/0091084 A1 | 4/2013 | Lee |
| 2013/0097482 A1 | 4/2013 | Marantz et al. |
| 2013/0124193 A1 | 5/2013 | Holmberg |
| 2013/0124567 A1 | 5/2013 | Balinsky et al. |
| 2013/0151305 A1 | 6/2013 | Akinola et al. |
| 2013/0151453 A1 | 6/2013 | Bhanot et al. |
| 2013/0166480 A1 | 6/2013 | Popescu et al. |
| 2013/0225212 A1 | 8/2013 | Khan |
| 2013/0246560 A1 | 9/2013 | Feng et al. |
| 2013/0251233 A1 | 9/2013 | Yang et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0275446 A1 | 10/2013 | Jain et al. |
| 2013/0275905 A1* | 10/2013 | Bhaskaran ............ G06F 3/048 715/771 |
| 2013/0288719 A1 | 10/2013 | Alonzo |
| 2013/0332862 A1* | 12/2013 | Mirra ................ G06Q 40/06 715/760 |
| 2014/0019423 A1 | 1/2014 | Leinsberger et al. |
| 2014/0047319 A1 | 2/2014 | Eberlein |
| 2014/0089339 A1 | 3/2014 | Siddiqui et al. |
| 2014/0101076 A1* | 4/2014 | Martin ............... G06N 20/00 706/11 |
| 2014/0129936 A1 | 5/2014 | Richards et al. |
| 2014/0208281 A1 | 7/2014 | Ming |
| 2014/0222793 A1 | 8/2014 | Sadkin et al. |
| 2014/0244284 A1 | 8/2014 | Smith |
| 2014/0244388 A1 | 8/2014 | Manouchehri et al. |
| 2014/0358829 A1 | 12/2014 | Hurwitz |
| 2015/0026622 A1 | 1/2015 | Roaldson et al. |
| 2015/0046481 A1 | 2/2015 | Elliot |
| 2015/0073954 A1 | 3/2015 | Braff |
| 2015/0089353 A1 | 3/2015 | Folkening |
| 2015/0100559 A1 | 4/2015 | Nassar |
| 2015/0100907 A1 | 4/2015 | Erenrich et al. |
| 2015/0106379 A1 | 4/2015 | Elliot et al. |
| 2015/0142766 A1 | 5/2015 | Jain et al. |
| 2015/0186483 A1 | 7/2015 | Tappan et al. |
| 2015/0212663 A1 | 7/2015 | Papale et al. |

(56) References Cited

U.S. PATENT DOCUMENTS

| | | | |
|---|---|---|---|
| 2015/0254220 A1 | 9/2015 | Burr et al. | |
| 2015/0261847 A1 | 9/2015 | Ducott et al. | |
| 2016/0062555 A1 | 3/2016 | Ward et al. | |
| 2016/0098176 A1 | 4/2016 | Cervelli et al. | |
| 2016/0110369 A1 | 4/2016 | Cervelli et al. | |
| 2016/0162519 A1 | 6/2016 | Stowe et al. | |
| 2016/0225271 A1* | 8/2016 | Robichaud | G06F 16/2423 |
| 2016/0232457 A1* | 8/2016 | Gray | G06T 11/206 |
| 2017/0031659 A1* | 2/2017 | Burke | G06F 16/248 |
| 2017/0053552 A1* | 2/2017 | Zhong | A61M 5/142 |
| 2017/0060367 A1* | 3/2017 | Berlingerio | G06T 11/206 |
| 2017/0364570 A1* | 12/2017 | Jacob | G06F 16/258 |
| 2017/0371881 A1* | 12/2017 | Reynolds | G06F 17/3056 |
| 2018/0129372 A1* | 5/2018 | Ellis | G06F 3/0482 |

FOREIGN PATENT DOCUMENTS

| | | |
|---|---|---|
| CN | 102054015 | 5/2014 |
| DE | 102014204840 | 9/2014 |
| DE | 102014215621 | 2/2015 |
| EP | 1672527 | 6/2006 |
| EP | 2221725 | 8/2010 |
| EP | 2778913 | 9/2014 |
| EP | 2778914 | 9/2014 |
| EP | 2778986 | 9/2014 |
| EP | 2911078 | 8/2015 |
| EP | 2993595 | 3/2016 |
| EP | 3002691 | 4/2016 |
| EP | 3009943 | 4/2016 |
| EP | 3018553 | 5/2016 |
| EP | 3032441 | 6/2016 |
| GB | 2366498 | 3/2002 |
| GB | 2513007 | 10/2014 |
| GB | 2518745 | 4/2015 |
| NL | 2013306 | 2/2015 |
| NL | 2011642 | 8/2015 |
| WO | WO 01/025906 | 4/2001 |
| WO | WO 2001/088750 | 11/2001 |
| WO | WO 2002/035376 | 5/2002 |
| WO | WO 2003/060751 | 7/2003 |
| WO | WO 2007/133206 | 11/2007 |
| WO | WO 2008/064207 | 5/2008 |
| WO | WO 2010/030913 | 3/2010 |
| WO | WO 2010/030914 | 3/2010 |
| WO | WO 2011/071833 | 6/2011 |
| WO | WO 2012/119008 | 9/2012 |
| WO | WO-2012/177394 | 12/2012 |

OTHER PUBLICATIONS

"GrabUp—What a Timesaver!" <http://atlchris.com/191/grabup/>, Aug. 11, 2008, pp. 3.
"Remove a Published Document or Blog Post," Sharing and Collaborating on Blog Post.
Abbey, Kristen, "Review of Google Docs," May 1, 2007, pp. 2.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Anonymous, "BackTult—JD Edwards One World Version Control System," printed Jul. 23, 2007 in 1 page.
Bluttman et al., "Excel Formulas and Functions for Dummies," 2005, Wiley Publishing, Inc., pp. 280, 284-286.
Chaudhuri et al., "An Overview of Business Intelligence Technology," Communications of the ACM, Aug. 2011, vol. 54, No. 8.
Conner, Nancy, "Google Apps: The Missing Manual," May 1, 2008, pp. 15.
Delicious, <http://delicious.com/> as printed May 15, 2014 in 1 page.
Ferreira et al., "A Scheme for Analyzing Electronic Payment Systems," Basil 1997.
Galliford, Miles, "SnagIt Versus Free Screen Capture Software: Critical Tools for Website Owners," <http://www.subhub.com/articles/free-screen-capture-software>, Mar. 27, 2008, pp. 11.
Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.
Gu et al., "Record Linkage: Current Practice and Future Directions," Jan. 15, 2004, pp. 32.
Hua et al., "A Multi-attribute Data Structure with Parallel Bloom Filters for Network Services", HiPC 2006, LNCS 4297, pp. 277-288, 2006.
JetScreenshot.com, "Share Screenshots via Internet in Seconds," <http://web.archive.org/web/20130807164204/http://www.jetscreenshot.com/>, Aug. 7, 2013, pp. 1.
Johnson, Maggie, "Introduction to YACC and Bison".
Kahan et al., "Annotea: An Open RDF Infrastructure for Shared Web Annotations", Computer Networks, Elsevier Science Publishers B.V., vol. 39, No. 5, dated Aug. 5, 2002, pp. 589-608.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontoloty Management System (Design)," Information Societies Technology Programme, Jan. 10, 2002, pp. 1-27.
Kwout, <http://web.archive.org/web/20080905132448/http://www.kwout.com/>Sep. 5, 2008, pp. 2.
Microsoft Windows, "Microsoft Windows Version 2002 Print Out 2," 2002, pp. 1-6.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Miklau et al., "Securing History: Privacy and Accountability in Database Systems," 3 rd Biennial Conference on Innovative Data Systems Research (CIDR), Jan. 7-10, 2007, Asilomar, California, pp. 387-396.
Morrison et al., "Converting Users to Testers: An Alternative Approach to Load Test Script Creation, Parameterization and Data Corellation," CCSC: Southeastern Conference, JCSC 28, Dec. 2, 2012, pp. 188-196.
Niepert et al., "A Dynamic Ontology for a Dynamic Reference Work", Joint Conference on Digital Libraries, Jun. 17-22, 2007, Vancouver, British Columbia, Canada, pp. 1-10.
Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share22 , Mar. 4, 2008, pp. 2.
Nivas, Tuli, "Test Harness and Script Design Principles for Automated Testing of non-GUI or Web Based Applications," Performance Lab, Jun. 2011, pp. 30-37.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, http://oreilly.com/digitalmedia/2006/01/01/mac-os-x-screenshot-secrets.html published Jan. 1, 2006 in 10 pages.
Palantir, "Extracting and Transforming Data with Kite," Palantir Technologies, Inc., Copyright 2010, pp. 38.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "Kite," https://docs.palantir.com/gotham/3.11.1.0/adminreference/datasources.11 printed Aug. 30, 2013 in 2 pages.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, https://docs.palantir.com/gotham/3.11.1.0/dataguide/baggage/KiteSchema.xsd printed Apr. 4, 2014 in 4 pages.
Palantir, https://docs.palantir.com/gotham/3.11.1.0/dataguide/baggage/KiteSchema printed Aug. 30, 2013 in 1 page.
Palermo, Christopher J., "Memorandum," [Disclosure relating to U.S. Appl. No. 13/916,447, filed Jun. 12, 2013, and related applications], Jan. 31, 2014 in 3 pages.

(56) References Cited

OTHER PUBLICATIONS

Schroder, Stan, "15 Ways to Create Website Screenshots," <http://mashable.com/2007/08/24/web-screenshots/>, Aug. 24, 2007, pp. 2.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
Symantec Corporation, "E-Security Begins with Sound Security Policies," Announcement Symantec, Jun. 14, 2001.
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Wollrath et al., "A Distributed Object Model for the Java System," Conference on Object-Oriented Technologies and Systems, Jun. 17-21, 1996, pp. 219-231.
Communication pursuant to Article 94(3) for EP Appln. No. 18183715.4 dated May 19, 2020, 6 pages.
Extended European Search Report for EP Appln. No. 18183715.4 dated Oct. 1, 2018, 11 pages.

\* cited by examiner

SYSTEMS AND METHODS FOR CREATING AND MANAGING A DATA INTEGRATION WORKSPACE CONTAINING AUTOMATICALLY UPDATED DATA MODELS

CROSS REFERENCE TO RELATED APPLICATIONS

This application claims the benefit under 35 U.S.C. § 119(e) of U.S. Provisional Application Ser. No. 62/584,665, filed Nov. 10, 2017, the content of which is incorporated by reference in its entirety into the present disclosure.

TECHNICAL FIELD

This disclosure relates to approaches for creating and managing a data integration workspace in which datasets and models based on the datasets may be visualized and manipulated.

BACKGROUND

Under conventional approaches, mapping the connections between data stored in a system may be difficult. Similarly, identifying issues with models based on stored data may be difficult as users generating the models may be unfamiliar with the subject matter of the data or the information presented in the models based on the data. At the same time, subject matter experts using the models are often unable to identify and/or convey issues in the models that are related to the underlying data or how the underlying data is being used to generate the models. These and other drawbacks exist with conventional solutions.

SUMMARY

A claimed solution rooted in computer technology overcomes problems specifically arising in the realm of computer technology. Various embodiments of the present disclosure may include systems, methods, and non-transitory computer readable media configured to create and manage a data integration workspace. The workspace may comprise one or more views of data (or datasets) stored in or accessible by the system. For example, an ontological view that depicts the relationships between a plurality of datasets may be presented via a graphical user interface. Models may be generated and updated based on the plurality of datasets and presented via a graphical user interface. In some implementations, models and/or datasets may be presented in a split screen view via a graphical user interface. In some implementations, feedback may be received via a graphical user interface presenting a model. A dataset associated with the model may be annotated based on the feedback. If the dataset or rules associated with the dataset are modified based on the feedback, the model and one or more other models may be automatically updated based on the modification. In some implementations, templates associated with one or more types of users may be defined. Each template may comprise one or more specific models related to a specific type of user. These and one or more other features of the data integration workspace may be presented via a graphical user interface.

In various embodiments, the systems, methods, and non-transitory computer readable media are configured to provide a data integration workspace comprising one or more views of datasets and/or models based on the one or more datasets. For example, the one or more views may comprise a list view, an object view, an ontological view, a pipeline view, and/or one or more other views. An ontological view may depict connections between one or more datasets and/or one or more columns or rows of one or more datasets. A pipeline view may depict how a first set of one or more datasets may be used to generate a second set of one or more datasets, how the second set of one or more datasets may be used to generate a third set of one or more datasets, and so on.

In various embodiments, the systems, methods, and non-transitory computer readable media are configured to provide a data integration workspace comprising a split screen view. A split screen view may comprise the simultaneous visualization of multiple of one or more datasets, information associated with one or more datasets, one or more views of one or more datasets and/or information associated with one or more datasets, one or more models based on the one or more datasets, rules for the one or more models indicating how one or more datasets are used to generate the one or more models, different working versions of the foregoing, and/or other information or displays available via the data integration workspace. In some embodiments, the systems, methods, and non-transitory computer readable media are configured to display a split screen view in which a dataset on one side of the split screen view may be modified and a related model on the other side of the split screen view may be automatically updated based on the modification.

In various embodiments, the systems, methods, and non-transitory computer readable media are configured to facilitate access to the data integration workspace by individual users based on one or more access controls associated with the individual users. The access controls may restrict access by a user to one or more models and/or features of the data integration workspace based on defined security permissions. The one or more access controls associated with each individual may be based on the type of user (e.g., an administrative user or an end user).

In various embodiments, the systems, methods, and non-transitory computer readable media are configured to utilize feedback received from one or more users to update a model and/or a dataset upon which a model is based. For example, an end user (e.g., a subject matter expert for whom the model is intended) may identify one or more issues associated with a dataset. Edits or comments made by the end user on the model may cause an underlying dataset upon which the model is based to be annotated. In various embodiments, the systems, methods, and non-transitory computer readable media are configured to automatically update one or more datasets or models based on modifications made to the annotated dataset and stored connections or associations between the one or more datasets or models and the annotated dataset.

In various embodiments, the systems, methods, and non-transitory computer readable media are configured to manage access to a one or more datasets, models, and/or features of the data integration workspace based on one or more templates. A template may comprise a predefined set of models and/or features of the data integration workspace associated with one or more particular types of users. When a template is updated, the set of one or more datasets, models, and/or features of the data integration workspace accessible by the type of user associated with the template may be automatically updated accordingly.

In various embodiments, the systems, methods, and non-transitory computer readable media are configured to enable collaborative editing of the data integration workspace. In some embodiments, the systems, methods, and non-transitory computer readable media are configured to store multiple edited versions of a component of the data integration workspace created by multiple users without modifying the component within the data integration workspace. In some embodiments, the systems, methods, and non-transitory computer readable media are configured to anonymize datasets accessible via the data integration workspace to enable users who are restricted from accessing the underlying data to work on the workspace without exposing the users to restricted data.

These and other features of the systems, methods, and non-transitory computer readable media are disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention(s).

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention(s) are utilized, and the accompanying drawings of which:

DETAILED DESCRIPTION

A claimed solution rooted in computer technology overcomes problems specifically arising in the realm of computer technology. Various embodiments of the present disclosure may include systems, methods, and non-transitory computer readable media configured to create and manage a data integration workspace. The workspace may comprise one or more views of data (or datasets) stored in or accessible by the system. For example, an ontological view that depicts the relationships between a plurality of datasets may be presented via a graphical user interface. Models may be generated and updated based on the plurality of datasets and presented via a graphical user interface. In some implementations, models and/or datasets may be presented in a split screen view via a graphical user interface. In some implementations, feedback may be received via a graphical user interface presenting a model. A dataset associated with the model may be annotated based on the feedback. If the dataset or rules associated with the dataset are modified based on the feedback, the model and one or more other models may be automatically updated based on the modification. In some implementations, templates associated with one or more types of users may be defined. Each template may comprise one or more specific models related to a specific type of user. These and one or more other features of the data integration workspace may be presented via a graphical user interface.

Figure 1:
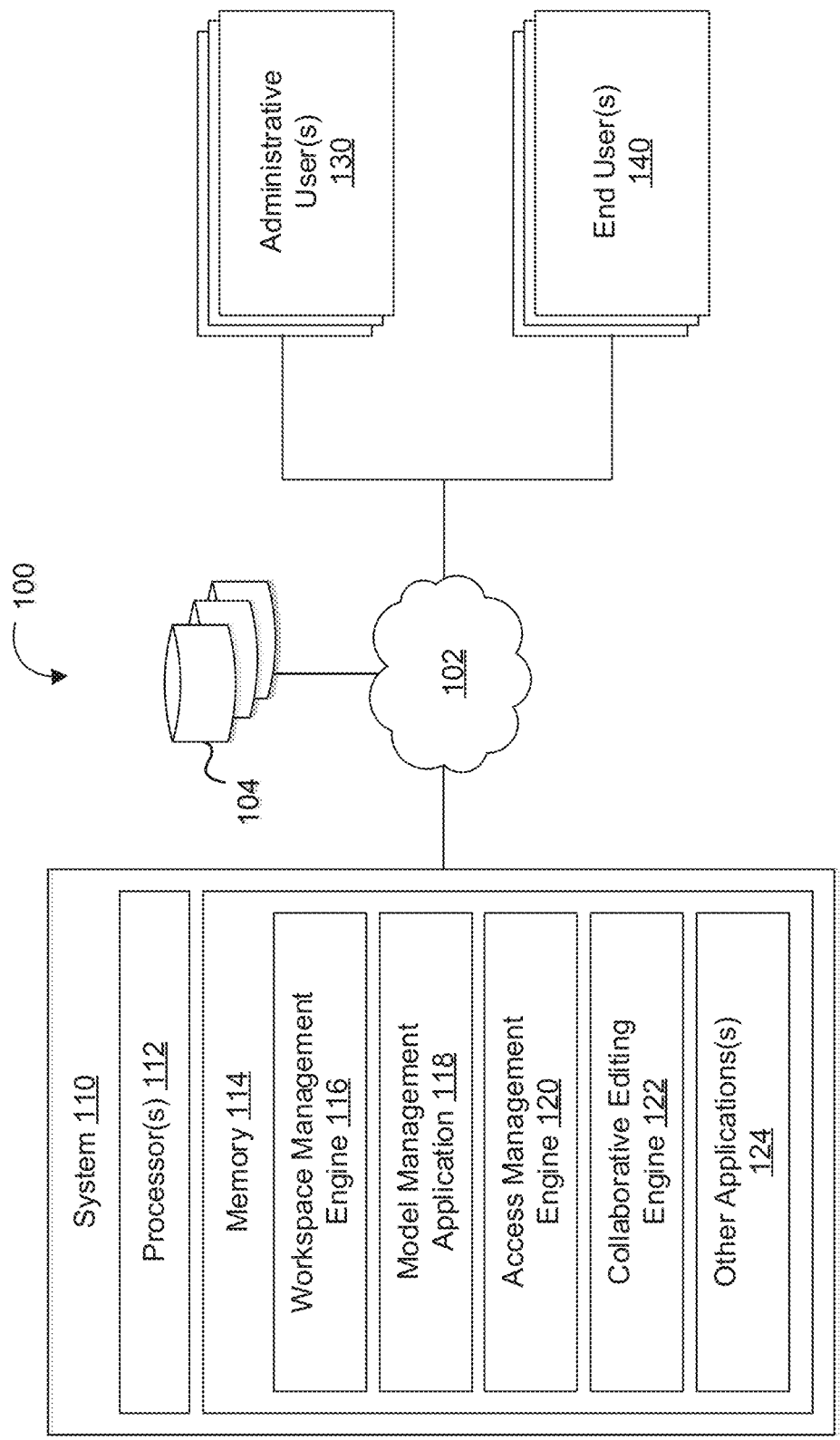
FIG. 1 depicts a diagram of an example of a system for providing a data integration workspace, in accordance with various embodiments.

FIG. 1 depicts a diagram of an example of an environment 100 for providing a data integration workspace, in accordance with various embodiments. As shown in FIG. 1, example environment 100 may include one or more databases 104, a computing system 110, one or more administrative user devices 130, one or more end user devices 140, and/or other components. The one or more components of environment 100 may be able to communicate via one or more computer networks 102 and may each have full or restricted access to one or more databases 104.

The computing system 110 may include one or more processors 112 and memory 114. Memory 114 may be non-transitory and computer-readable. Memory 114 may store one or more computer program instructions that, when executed by the one or more processors 112, cause the one or more processors 112 to perform various operations described herein. The one or more instructions may include workspace management engine 116, model management application 118, access management engine 120, collaborative editing engine 122, and/or one or more other applications 124 that program the computing system 110 to perform various operations. As used herein, for convenience, the various applications stored in memory 114 will be described as performing an operation, when, in fact, the various applications comprise instructions which may program the processors 112 (and therefore computing system 110) to perform the operation.

Workspace management engine 116 may be configured to create and manage a data integration workspace. In various implementations, workspace management engine 116 may be configured to create and manage a data integration workspace that facilitates access to one or more datasets and/or one or more features associated with the one or more datasets. For example, workspace management engine 116 may be configured to generate and manage a data integration workspace via which datasets, models based on one or more datasets, applications based on the one or more models and/or the one or more datasets, and/or other features of the data integration workspace may be accessed and/or managed. The one or more datasets accessible via the data integration workspace may include datasets stored in one or more databases 104, datasets stored in memory 114, datasets imported to environment 100 by one or more administrative users and/or one or more end users, and/or datasets otherwise accessible by one or more components of environment 100.

In various implementations, workspace management engine 116 may be configured to generate and manage a data integration workspace displayed via a graphical user interface. In some implementations, workspace management engine 116 may be configured to generate and manage a data integration workspace to be presented as a dashboard. In various implementations, workspace management engine 116 may be configured to generate and manage a data integration workspace to be presented via a display interface on one or more user devices. For example, workspace management engine 116 may be configured to enable the data integration workspace to be accessed, for presentation, via one or more administrative user devices 130, one or more end user devices 140, and/or one or more other user devices.

In various implementations, workspace management engine 116 may be configured to cause information associated with one or more datasets to be presented via a graphical user interface. Information associated with a dataset may include the name of the dataset, the size of the dataset, column information, row information, access information, connection information, and/or other information associated with the dataset. Access information for a dataset may include information indicating previous user access or alterations to a dataset, security permissions associated with a dataset, and/or other access/security information associated with a dataset. Connection information may include information indicating connections between a dataset and one or more other datasets and/or connections between a dataset and one or more models based on the dataset or an aspect of the dataset. A dataset may be connected to one or more other datasets via one or more individual columns and/or one or more individual rows (e.g., one or more columns or rows of a single dataset may be integrated into or share information with one or more columns or rows of a separate dataset). A dataset may be connected to one or more models by including the underlying data upon which the model is based. Connection information may indicate how an underlying dataset is being utilized in each particular model to which it is connected. Using the data integration workspace, a user may, for example, be able to view all the data (i.e., datasets) in a system and identify all information related to the data in one place.

In various implementations, workspace management engine 116 may be configured to display information associated with one or more other datasets based on a user selection of information associated with a dataset displayed via a graphical user interface. For example, responsive to user selection of a connection between a column of a dataset and one or more other datasets, workspace management engine 116 may be configured to display information associated with the one or more other datasets. In various implementations, workspace management engine 116 may be configured to modify information associated with a dataset based on user feedback received via a graphical user interface displaying the data integration workspace. For example, responsive to user indication of an intention to modify information associated with a dataset, workspace management engine 116 may be configured to modify the dataset and all other datasets and/or models based on the dataset based on the intended modification.

In various implementations, workspace management engine 116 may be configured to display one or more datasets and/or information associated with one or more datasets in one or more views. For example, workspace management engine 116 may be configured to display one or more datasets and/or information associated with one or more datasets in a list view, an object view, an ontological view, a pipeline view, and/or one or more other views. Responsive to a user selection of a dataset and/or information associated with a dataset in the one or more views, workspace management engine 116 may be configured to display information a selected dataset, information associated with a selected dataset, selected information associated with a dataset, a dataset connected to a selected dataset or selected information associated with a dataset, and/or other information related to the user selection.

In some implementations, workspace management engine 116 may be configured to display one or more datasets and/or information associated with one or more datasets in an ontological view. An ontological view may depict one or more connections between one or more datasets and/or one or more columns or rows of one or more datasets. In some implementations, workspace management engine 116 may be configured to display an ontological view that provides a visualization of one or more connections between one or more datasets and/or one or more columns or rows of one or more datasets.

In some implementations, workspace management engine 116 may be configured to display one or more datasets and/or information associated with one or more datasets in a pipeline view. A pipeline view may depict how a first set of one or more datasets may be used to generate a second set of one or more datasets, how the second set of one or more datasets may be used to generate a third set of one or more datasets, and so on. In some implementations, workspace management engine 116 may be configured to display a pipeline view that provides a visualization of how datasets are used to build one or more other datasets.

In various implementations, workspace management engine 116 may be configured to display one or more models based on one or more datasets via a graphical user interface. For example, a model may include a mathematical model displaying information relevant to an end user based on one or more datasets accessible to one or more components of environment 100. In some implementations, a model may include a static report generated based on one or more datasets. In some implementations, a model may include an interactive report. For example, workspace management engine 116 may be configured to display additional information and/or navigate to one or more datasets or other models responsive to user selection of a component of a model. In an exemplary implementation, a component of a model may be based on a specific dataset which is also connected to one or more other models. Based on connection information associated with the component of the model and the underlying dataset, workspace management engine 116 may be configured to display the underlying dataset, information associated with the underlying dataset, the one or more other models, and/or other information associated with the component of the model responsive to user selection of the component.

In various implementations, the one or more models caused to be displayed by workspace management engine 116 may be created and managed by model management application 118. Various operations performed by model management application 118 are described further below in reference to FIG. 3.

In various implementations, workspace management engine 116 may be configured to display one or more datasets, information associated with one or more datasets, one or more views of one or more datasets, one or more models based on the one or more datasets, rules for the one or more models indicating how one or more datasets are used to generate the one or more models, and/or other information accessible by one or more components of environment 100. The rules for a model may include the underlying computer programming indicating how one or more datasets are used to generate the model. In some implementations, workspace management engine 116 may be configured to display one or more datasets, information associated with one or more datasets, one or more views of one or more datasets and/or information associated with one or more datasets, one or more models based on the one or more datasets, rules for the one or more models indicating how one or more datasets are used to generate the one or more models, and/or other information accessible by one or more components of environment 100 in a split screen view via a graphical user interface. A split screen view may include the simultaneous visualization of multiple of one or more datasets, information associated with one or more datasets, one or more views of one or more datasets and/or information associated with one or more datasets, one or more models based on the one or more datasets, rules for the one or more models indicating how one or more datasets are used to generate the one or more models, and/or other information accessible by one or more components of environment 100 via a single graphical user interface.

Figure 4:
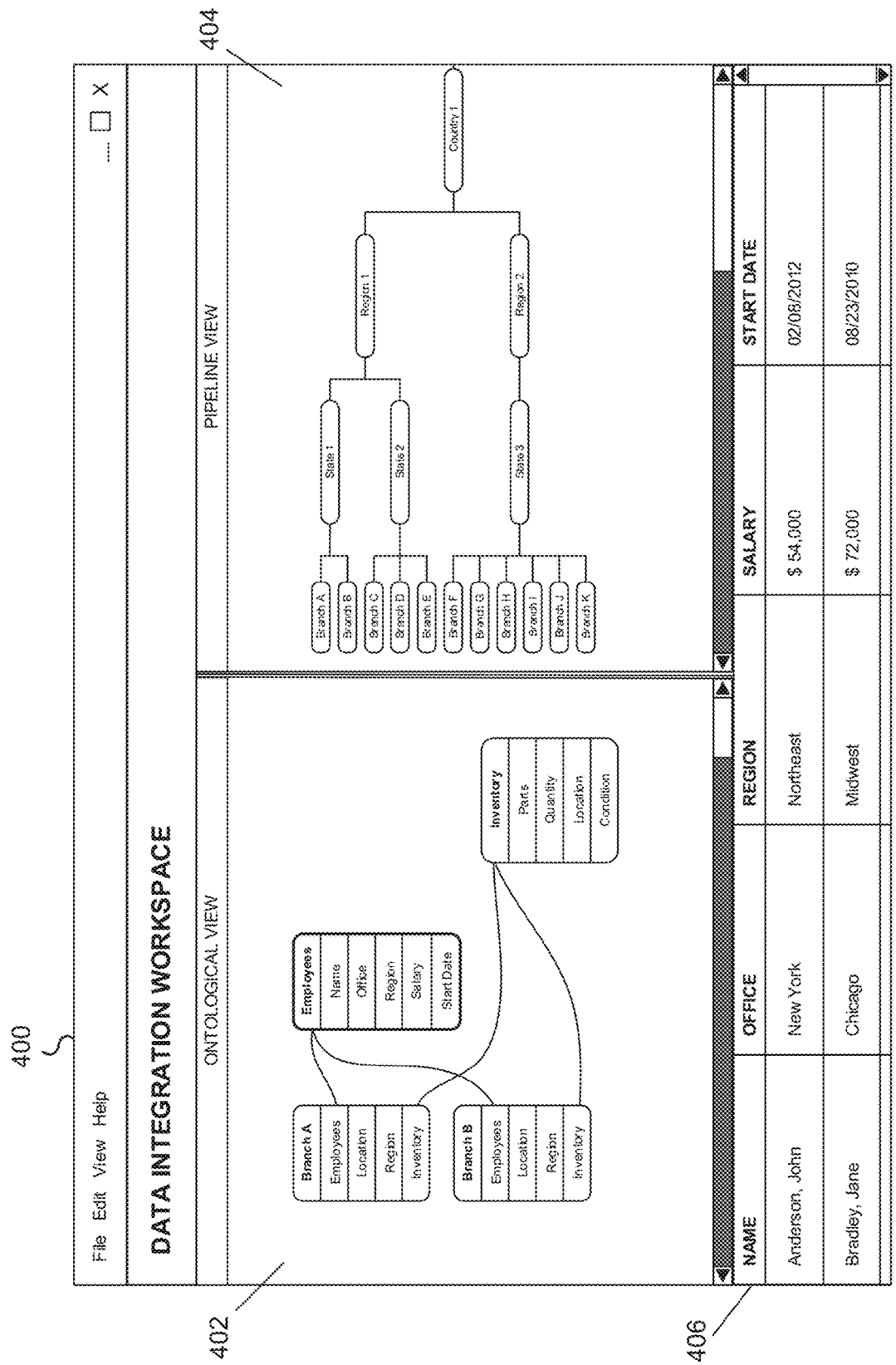
FIG. 4 depicts an exemplary interface of a data integration workspace displaying a split screen view, in accordance with various embodiments.

For example, and referring to FIG. 4, FIG. 4 depicts an exemplary interface 400 of a data integration workspace displaying a split screen view, in accordance with various embodiments. Exemplary interface 400 may include an ontological view 402, a pipeline view 404, information related to one or more selected datasets 406, and/or one or more other components. Ontological view 402 may depict connections between various datasets. For example, ontological view 402 may depict a connection between an "Employees" column of dataset "Branch A" and an "Employees" dataset along with a connection between an "Employees" column of dataset "Branch B" and the "Employees" dataset. Ontological view 402 may be used to determine how one or columns of one or more datasets are interrelated. Pipeline view 404 may be depict how one or more datasets are incorporated into one or more other datasets. For example, pipeline view 404 may depict a first set of datasets related to Branches A-K are used to generate a second set of datasets related to States 1-3, how the second set of datasets related to States 1-3 are used to generate a third set of datasets related to Regions 1 and 2, and how the third set of datasets related to Regions 1 and 2 are used to generate a dataset related to Country 1.

In various implementations, and referring back to FIG. 1, workspace management engine 116 may be configured to display a model on one side of a split screen and rules for generating the model based on one or more datasets on the other side of the split screen. In some implementations, workspace management engine 116 may be configured to receive user input related to rules for generating a model based on one or more datasets via a graphical user interface displaying the split screen, modify the one or more rules based on the user input, and cause the model displayed on the other side of the split screen to be automatically updated based on the modification of the one or more rules. Using the split screen, one or more users may be able to modify the underlying code governing a model while visualizing the resulting impact of their modifications on the same screen.

In various implementations, workspace management engine 116 may be configured to store one or more user preferences related to a split screen view. For example, workspace management engine 116 may be configured to store user preferences for an administrative user that indicate that the rules for generating a model based on one or more dataset are to be displayed in a split screen with the model each time the model is accessed. In some implementations, workspace management engine 116 may be configured to store associations between one or more models and/or datasets in the user preferences that indicate that the associated one or more models and/or datasets are to be displayed simultaneously when accessed.

In various implementations, workspace management engine 116 may be configured to facilitate access to the data integration workspace by individual users based on one or more access controls associated with the individual users. For example, datasets, models based on one or more datasets, applications based on the one or more models and/or the one or more datasets, and/or other features of the data integration workspace may be accessed based on one or more access controls and/or rules managed by access management engine 120.

Access management engine 120 may be configured to manage one or more access controls associated with the data integration workspace. The one or more access controls may restrict access by a user to one or more models and/or one or more features of the data integration workspace based on one or more defined security permissions. In various implementations, access management engine 120 may be configured to manage one or more individual access controls associated with each user of the data integration workspace. For example, access management engine 120 may be configured to manage one or more access control lists defining security permissions associated with one or more individual users. In various implementations, security permissions associated with an individual user may indicate whether the user is able to access and/or modify one or more particular datasets, whether the user is able to access and/or modify one or more particular models, whether the user is able to access and/or modify particular rules for one or more models, and/or whether the user is able to access one or more other features of the data integration workspace. In various implementations, access management engine 120 may be configured to restrict a user's access to or ability to modify one or more particular datasets, one or more particular models, rules for one or more models, and/or other features of the data integration workspace based on the security permissions.

In various implementations, access management engine 120 may be configured to determine security permissions for a user based on whether the user is an administrative user or an end user. In some implementations, access management engine 120 may be configured to define a set of security permissions associated with administrative users and a set of security permissions associated with end users. For example, an administrative user may be able to access and modify datasets, as well as rules for one or more models indicating how one or more datasets are used to generate the models. However, an end user may be restricted from even accessing one or more datasets, let alone modifying the restricted datasets. Similarly, an end user may restricted from accessing or modifying rules for one or more models indicating how one or more datasets are used to generate the models.

In various implementations, access management engine 120 may be configured to determine security permissions for a user based on user information indicating the type of user. For example, access management engine 120 may be configured to establish access controls that restrict a particular user to a template associated with the type of user. A template may include a predefined set of models and/or features of the data integration workspace associated with one or more particular types of users.

In some implementations, access management engine 120 may be configured to modify one or more security permissions of an individual user based on user input. For example, access management engine 120 may be configured to modify one or more security permissions of an individual user based on user input received from an administrative user. In some implementations, access management engine 120 may be configured to receive a request to modify one or more security permissions of an individual user and prompt an administrative user based on the request. In some implementations, access management engine 120 may be configured to hide one or more security permissions from users, restrict visibility of one or more security permissions to one or more particular users, and/or enable users to view their one or more security permissions.

In various implementations, access management engine 120 may be configured to restrict access to information accessible via the data integration workspace. For example, the information accessible via the data integration workspace may include one or more datasets, one or more views of one or more datasets and/or information associated with one or more datasets, one or more models based on the one or more datasets, rules for the one or more models indicating how one or more datasets are used to generate the one or more models, one or more versions of a component of data integration workspace, and/or other information accessible by one or more components of environment 100. In some implementations, the predefined labels may include private, shared, public, and/or other labels. "Private" may indicate that so-labeled information accessible via the data integration workspace is viewable only by a single user. "Published" may indicate that so-labeled information accessible via the data integration workspace is viewable only by one or more users and one or more other users to which they have shared the information, subject to security permissions. "Public" may indicate that so-labeled information accessible via the data integration workspace is available to all users, subject to security permissions.

In various implementations, access management engine 120 may be configured to store one or more security permissions associated with a plurality of users and/or one or more access control lists defining security permissions for a plurality of users in one or more databases 104, in memory 114, one or more data stores (e.g., data stores 208A and 208B), and/or other storage accessible to one or more components of environment 100 or system 200.

Collaborative editing engine 122 may be configured to enable stored information to be edited simultaneously by one or more users. For example, collaborative editing engine 122 may be configured to enable one or more datasets, models based on one or more datasets, applications based on the one or more models and/or the one or more datasets, and/or other components accessible via the data integration workspace to be edited simultaneously by one or more users. In various implementations, collaborative editing engine 122 may be configured to store edited versions of one or more components of the data integration workspace. For example, collaborative editing engine 122 may be configured to store edited versions of one or more components of the data integration workspace in association with one or more other stored versions of the one or more components. In various implementations, collaborative editing engine 122 may be configured to store one or more versions may be stored independently of the version currently deployed to one or more end users. In various implementations, collaborative editing engine 122 may be configured to allow access to a stored version or one or more different stored versions of the same component by multiple users at the same time. By enabling users to store one or more versions of a component deployed to end users, multiple users may work on the same component at the same time without affecting other users of the data integration workspace.

In various implementations, collaborative editing engine 122 may be configured to anonymize data accessible via data integration workspace. For example, collaborative editing engine 122 may be configured to encrypt one or more datasets, remove identifying information from one or more datasets, and/or otherwise modify one or more datasets to sanitize the data for viewing by one or more users. In some implementations, collaborative editing engine 122 may be configured to anonymize data accessible via data integration workspace to enable one or more users to view one or more datasets and/or models while editing one or more components of the data integration workspace without facilitating access to potentially confidential information. By anonymizing the data, individuals may work on the data integration workspace without potentially risking the security of the datasets/information underlying the data integration workspace.

Figure 2:
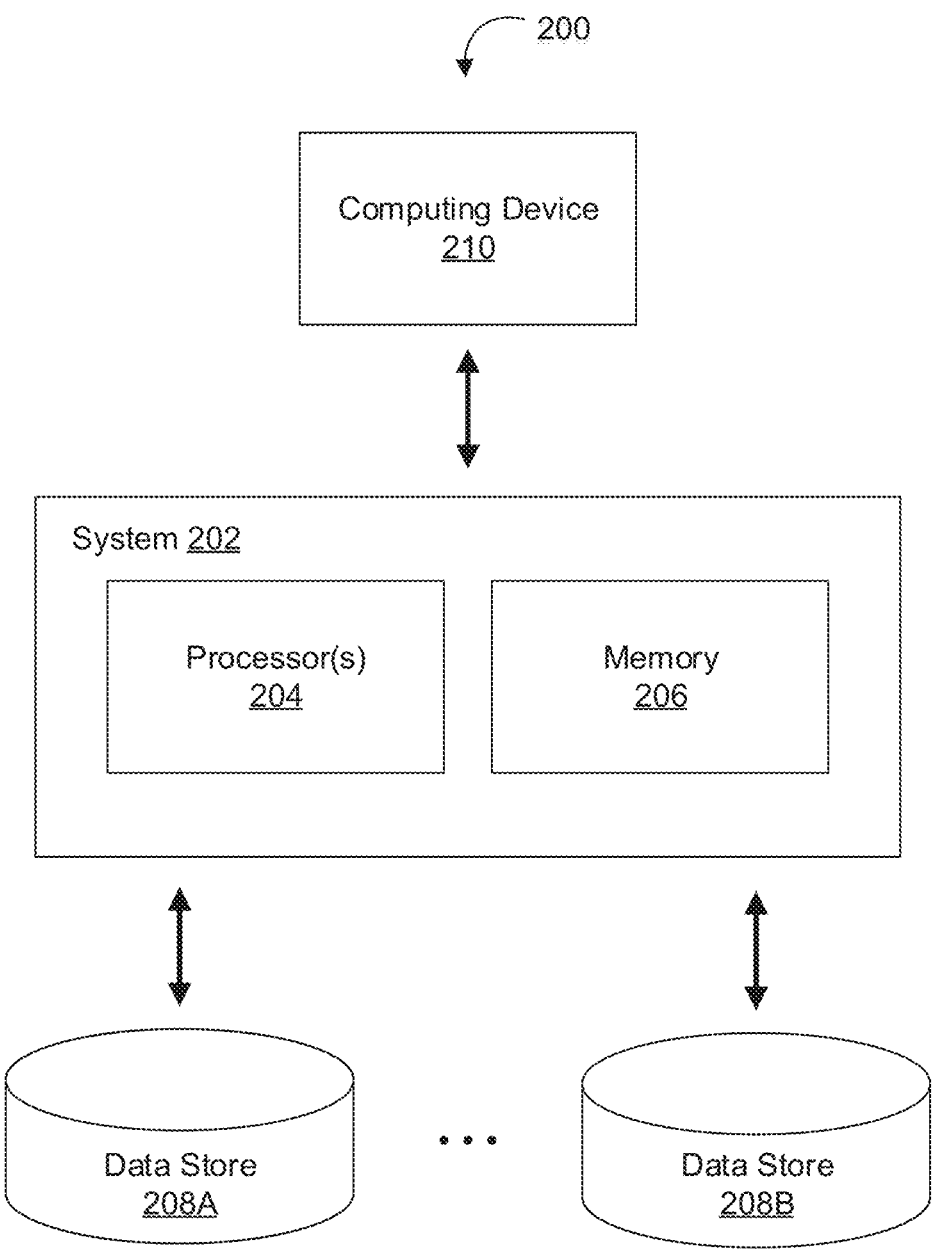
FIG. 2 depicts a diagram of an example of a system for managing models based on a plurality of datasets, in accordance with various embodiments.

FIG. 2 depicts a diagram of an example of a system 200 for managing models based on a plurality of datasets, in accordance with various embodiments. As shown in FIG. 2, the example system 200 can include at least one computing system 202 that includes one or more processors 204 and memory 206. The memory 206 may be non-transitory and computer-readable. The memory 206 may store one or more computer program instructions that, when executed by the one or more processors 204, cause the one or more processors 204 to perform various operations described herein. The system 200 may also include a computing device 210 that is able to communicate with the computing system 202 (e.g., over one or more computer networks) and one or more data stores (e.g., data stores 208A and 208B) that are accessible to system 200. In various implementations, the data stores 208A and/or 208B (e.g., databases stored in the data stores 208A and/or 208B) may store information necessary to manage one or more models based on a plurality of datasets. For example, the data stores 208A and/or 208B may store shared data related to one or more datasets, one or more models or applications based on the one or more datasets, one or more access control lists, one or more security permissions, one or more edited versions of components of the data integration workspace, one or more models associated with the one or more datasets, feedback received or annotations made in relation to models or datasets, errors identified based on feedback received from one or more users, one or more templates, rules for the one or more models indicating how one or more datasets are used to generate the one or more models, and/or other information accessible by one or more components of environment 100.

In some implementations, different databases and/or information may be stored in data stores that are accessible to the computing system 202. In some implementations, the data stores 208A and/or 208B may be managed and/or operated by different entities. For example, the data stores 208A and/or 208B may be managed and/or operated by one or more administrative users associated with one or more administrative user devices 130, one or more end users associated with one or more end user devices 140, and/or one or more other users or entities associated with computing system 202. Depending on the implementation, information stored in the data store 208A and/or the data store 208B may or may not be shared among entities managing the data stores 208A and 208B. In some implementations, data stores accessible to the computing system 202 (e.g., the data stores 208A and 208B) are shared among multiple entities (e.g., enterprise, organization, individual, group of individuals, etc.). This shared data may be used by the entities, for example, to derive constructive information.

In some embodiments, the computing system 202 and the computing device 210 may be integrated in a single device or system. Alternatively, the computing system 202 and the computing device 210 may operate as separate devices. For example, the computing device 210 may be a mobile device and the computing system 202 may be a server. The data store(s) may be stored anywhere accessible to the computing system 202, for example, in the memory 206, in the computing device 210, in another device coupled to the computing system 202, storage location (e.g., cloud-based storage system, network file system, etc.), storage device (e.g., network storage device), etc. In general, the computing system 202, the computing device 210, and the data stores 208A and/or 208B may be able to communicate with one another through one or more wired or wireless networks (e.g., the Internet) through which data can be communicated.

The one or more components of example system 200 may be the same or similar to the one or more components of example environment 100, described above in reference to FIG. 1. Various operations that are capable of being performed by the computing system 110 and the computing system 202 are described below in reference to FIG. 3 and FIG. 5.

Figure 3:
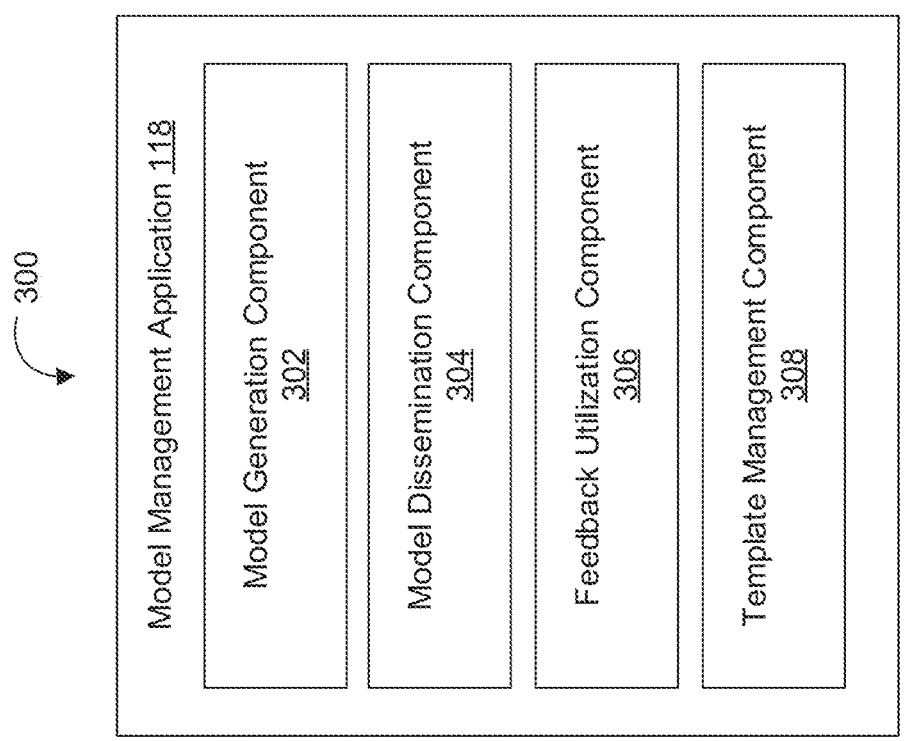
FIG. 3 depicts a diagram of an example of a model management application, in accordance with various embodiments.

FIG. 3 depicts a diagram 300 of an example of a model management application 118, in accordance with various embodiments. In various embodiments, functionality of the model management application 118 may be performed by one or more servers, workstations, desktop computers, laptop computers, mobile devices, and/or other computing devices. In some embodiments, functionality of the model management application 118 may be performed by the computing system 110 and/or the computing system 202. For example, the components of model management application 118 may comprise computer-readable instructions executable by processors 112 and/or processors 204. The components of model management application 118 may comprise model generation component 302, model dissemination component 304, feedback utilization component 306, template management component 308, and/or other computer program components. As used herein, for convenience, the various components of model management application 118 will be described as performing an operation, when, in fact, the various components comprise instructions which may program processors 112 and/or processors 204 (and therefore computing system 110 and/or computing system 202, respectively) to perform the operation.

Model generation component 302 may be configured to generate models based on one or more datasets. In various implementations, a model may comprise a mathematical model based on one or more datasets and related to one or more fields, industries, agencies, companies, individuals, and/or other subjects to which the one or more datasets are associated. In various implementations, models may be automatically generated, generated by one or more administrative users, developed based in part on end user feedback, and/or otherwise generated. In some implementations, model generation component 302 may be configured to receive one or more models via one or more computer networks (e.g., one or more computer networks 102). For example, model generation component 302 may be configured to receive one or more models from an administrative user via an administrative user device 130 and/or from an end user via an end user device 140. In various implementations, model generation component 302 may be configured to store one or more models associated with the one or more datasets in one or more databases 104, in memory 114, one or more data stores (e.g., data stores 208A and 208B), and/or other storage accessible to one or more components of environment 100 or system 200.

Model dissemination component 304 may be configured to facilitate access to one or more models via a graphical user interface. For example, model dissemination component 304 may be configured to cause one or more models to be displayed via a graphical user interface of administrative user device 130 and/or end user device 140. In some implementations, model dissemination component 304 may be configured to display one or more models in a split screen view via a graphical user interface. In various implementations, model dissemination component 304 may be configured to facilitate access to one or more models via a data integration workspace. In some implementations, model dissemination component 304 may be configured to facilitate access to one or more models by a user (e.g., an administrative user and/or an end user) based on one or more security permissions associated with the user. In some implementations, model dissemination component 304 may be configured to facilitate access to one or more models by a user based on a template created and managed by template management component 208. For example, model dissemination component 304 may be configured to facilitate access to one or more models by a specific type of user based on a template associated with users of that specific type.

Feedback utilization component 306 may be configured to utilize feedback received from one or more users to update a model and/or a dataset upon which a model is based. In various implementations, feedback utilization component 306 may be configured to receive user feedback related to a first model via a graphical user interface presenting the first model. For example, feedback utilization component 306 may be configured to receive user feedback related to a first model via a graphical user interface that is simultaneously displaying the first model. The feedback received may include user input related to a component of a model. In some implementations, the user input may relate to additional information to be included in a model, the modification of information in a model, the identification of an error in the model, and/or other user input related to a model. For example, feedback utilization component 306 may be configured to receive user input indicating a request to edit information presented or associated with a model. In various implementations, the user input may relate to the model, a component of the model, rules for the model indicating how one or more datasets are used to generate the model, the one or more datasets upon which the model is based, and/or other aspects of the model. For example, in a model based on sales information, user input may indicate that particular information depicted in a model is related to a particular component of a machine.

In various implementations, feedback utilization component 306 may be configured to annotate a dataset associated with a model based on feedback received. In various implementations, feedback utilization component 306 may be configured to annotate a dataset by storing an indication of the feedback in association with the dataset, editing the dataset to include an indication of the feedback received, and/or otherwise annotating the dataset based on the feedback. In some implementations, feedback utilization component 306 may be configured to annotate a dataset associated with a particular model based on feedback received via a graphical user interface displaying the particular model. In some implementations, the feedback received may identify an error associated with a particular component of a model. In some implementations, feedback utilization component 306 may be configured to annotate one or more datasets connected to the particular component of the model. For example, feedback utilization component 306 may be configured to annotate one or more datasets connected to a particular component of the model based on connection information indicating a connection between a model (or a particular component of a model) and one or more datasets (or one or more columns and/or rows of one or more datasets). In an exemplary implementation, a particular component of a model may be based on a column of a particular dataset. In the foregoing exemplary implementation, feedback utilization component 306 may be configured to annotate the column of the particular dataset based on the feedback received.

In various implementations, feedback utilization component 306 may be configured to store feedback received in relation to models or datasets and/or annotations made to models or datasets in one or more databases 104, in memory 114, one or more data stores (e.g., data stores 208A and 208B), and/or other storage accessible to one or more components of environment 100 or system 200. For example, feedback utilization component 306 may be configured to store feedback received and/or annotations made in association with the one or more models and/or the one or more datasets to which they relate. In some implementations, feedback utilization component 306 may be configured to store a list of errors identified in association with the one or more models and/or datasets related to each identified error. In some implementations, a list of errors may include an identification of a user associated with the feedback identifying the error, a time at which the feedback identifying the error was received, the model that was being displayed when the feedback identifying the error was received, one or more datasets associated with the error, one or more columns and/or rows associated with the identified error, and/or other information related to the identified error.

In various implementations, feedback utilization component 306 may be configured to cause one or more datasets and/or one or more models to be automatically updated based on feedback received. For example, the modification of information in a model may cause one or more datasets related to the model and/or one or more other models related to the model to be automatically updated based on the modification. In some implementations, feedback utilization component 306 may be configured to cause one or more datasets and/or one or more models to be automatically updated based on feedback received in real-time.

In various implementations, feedback utilization component 306 may be configured to cause one or more datasets and/or one or more models to be modified based on feedback received and/or annotations made in response to feedback received. For example, a user (such as an administrative user) may decide to modify one or more models, one or more datasets, and/or the rules for the one or more models in response to the feedback or annotation. In various implementations, feedback utilization component 306 may be configured to receive user input from a user and modify one or more models, one or more datasets, and/or the rules for the one or more models in response to the user input.

In various implementations, feedback utilization component 306 may be configured to automatically update one or more other datasets and/or one or more other models in response to the modification of one or more related datasets and/or one or more related models. For example, feedback utilization component 306 may be configured to automatically update one or more other datasets and/or one or more other models in response to the modification of one or more related datasets and/or one or more related models based on connection information indicating a connection between the one or more datasets or models.

Template management component 308 may be configured to create and manage one or more templates. A template may include a predefined set of models and/or features of the data integration workspace associated with one or more particular types of users. For example, a template may include a predefined set of models that suitable for administrative users and/or end users of one or more types. Types of end users may include health care professionals, engineers, sales associates, executives, and/or other types of users. In various implementations, template management component 308 may be configured to generate a template based on user input. For example, template management component 308 may be configured to generate a template based on user input indicating a set of models and/or a set of features to be associated with a particular type of user. In some implementations, only administrative users may generate templates and/or define one or more types of users. In various implementations, template management component 308 may be configured to store one or more templates associated with the one or more datasets in one or more databases 104, in memory 114, one or more data stores (e.g., data stores 208A and 208B), and/or other storage accessible to one or more components of environment 100 or system 200.

In various implementations, template management component 308 may be configured to indicate that a user is to be granted access to a predefined set of models and/or features of the data integration workspace based on access information and/or user information indicating the type of user for the user. In some implementations, user information indicating the type of user for the user may be determined based on user input. In some implementations, user information indicating the type of user for the user may only be determined by an administrative user. In various implementations, template management component 308 may be configured to modify one or more templates based on user input received. For example, user input may be received from an administrative user via a graphical user interface indicating that one or more models are to be removed from a particular template. Responsive to the user input, template management component 308 may be configured to automatically update the one or more models accessible by a user associated with the particular type.

Exemplary Flowcharts of Process

Figure 5:
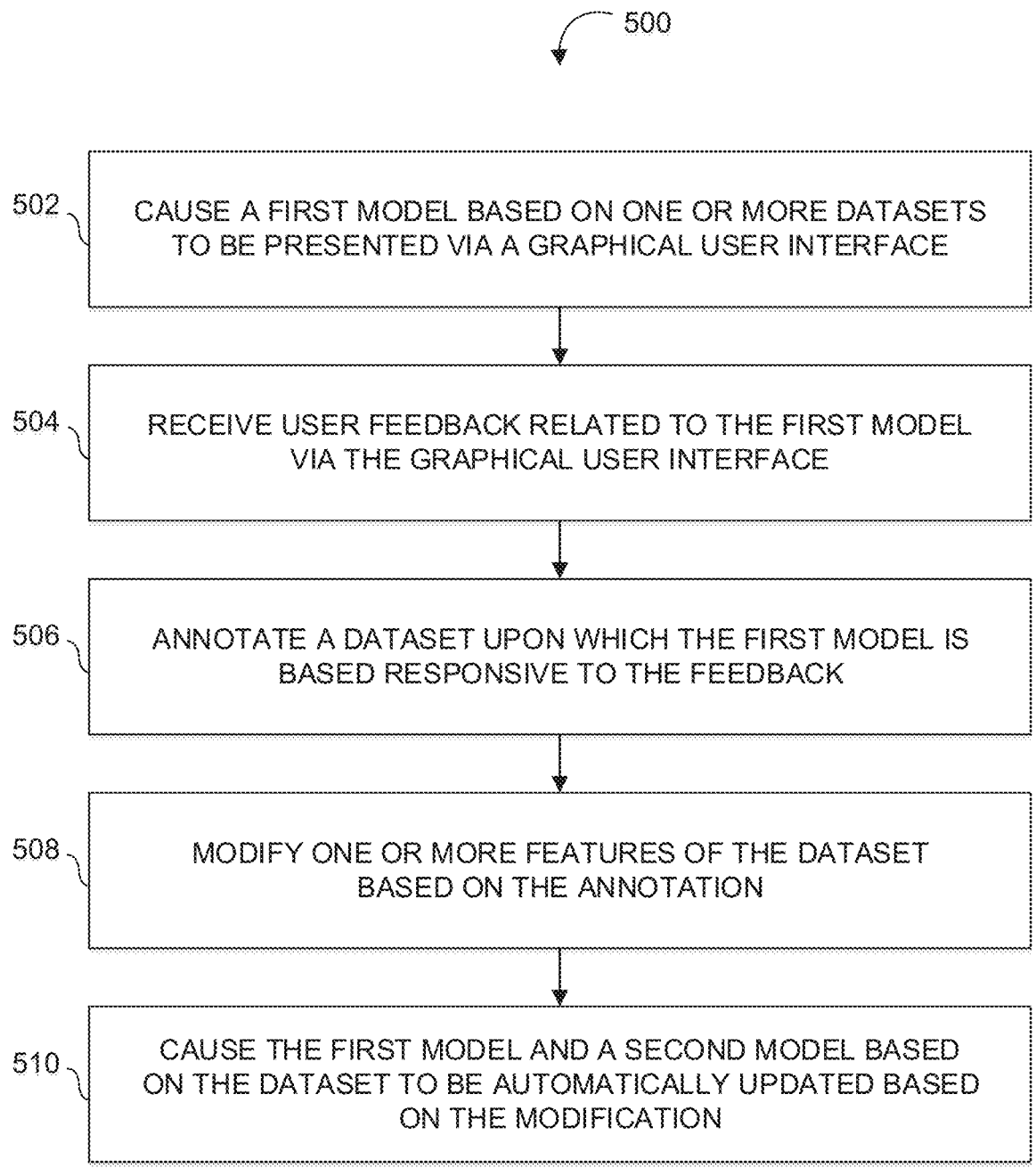
FIG. 5 depicts a flowchart of an example method for automatically updating one or more models based on issues identified in an underlying dataset, in accordance with various embodiments.

FIG. 5 depicts a flowchart of an example method 500 for automatically updating one or more models based on issues identified in an underlying dataset, in accordance with various embodiments. The operations of method 500 presented below are intended to be illustrative and, as such, should not be viewed as limiting. In some implementations, method 500 may be accomplished with one or more additional operations not described, and/or without one or more of the operations discussed. In some implementations, two or more of the operations may occur substantially simultaneously. The described operations may be accomplished using some or all of the system components described herein.

In an operation 502, method 500 may include causing a model based on one or more datasets to be presented via a graphical user interface. For example, a model may comprise a mathematical model based on one or more datasets and related to one or more fields, industries, agencies, companies, individuals, and/or other subjects to which the one or more datasets are associated. In various implementations, a user may be granted access to a plurality of models via a data integration workspace. In some implementations, the models may be displayed in a split screen view via a graphical user interface. In some implementations, a user may be granted access to one or more models based on one or more security permissions associated with the user. In some implementations, one or more models may be accessible by a user of a specific type based on a template associated with users of that specific type. In some implementations, operation 502 may be performed by a component the same as or similar to model dissemination component 304 (shown in FIG. 3 and described herein).

In an operation 504, method 500 may include receiving user feedback related to a first model via the graphical user interface. The feedback may be received from one or more users via a graphical user interface of a user device that is displaying the model. The feedback received may include user input related to a component of the model. For example, the user input may relate to additional information to be included in a model, the modification of information in a model, the identification of an error in the model, and/or other user input related to a model. In some implementations, operation 504 may be performed by a component the same as or similar to feedback utilization component 306 (shown in FIG. 3 and described herein).

In an operation 506, method 500 may include annotating a dataset upon which the model is based responsive to the user feedback. For example, a dataset may be annotated by storing an indication of feedback received in association with the dataset, editing the dataset to include an indication of the feedback received, and/or otherwise annotating the dataset based on the feedback. In various implementations, a particular dataset (or a particular column and/or row) may be annotated in response to user feedback related to a model based on connection information indicating a connection between the model and the particular dataset. In some implementations, operation 506 may be performed by a component the same as or similar to feedback utilization component 306 (shown in FIG. 3 and described herein).

In an operation 508, method 500 may include modifying one or more features of the dataset based on the annotation. For example, a user (such as an administrative user) may decide to modify one or more models, one or more datasets, and/or the rules for the one or more models in response to the feedback or annotation. In some implementations, operation 508 may be performed by a component the same as or similar to feedback utilization component 306 (shown in FIG. 3 and described herein).

In an operation 510, method 500 may include causing the first model and a second model that is based on the dataset to be automatically updated based on the modification. In various implementations, the first model and the second model may be automatically updated responsive to a modification of a dataset based on connection information indicating an association between the dataset and the first model and an association between the dataset and the second model. In some implementations, operation 510 may be performed by a component the same as or similar to feedback utilization component 306 (shown in FIG. 3 and described herein).

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
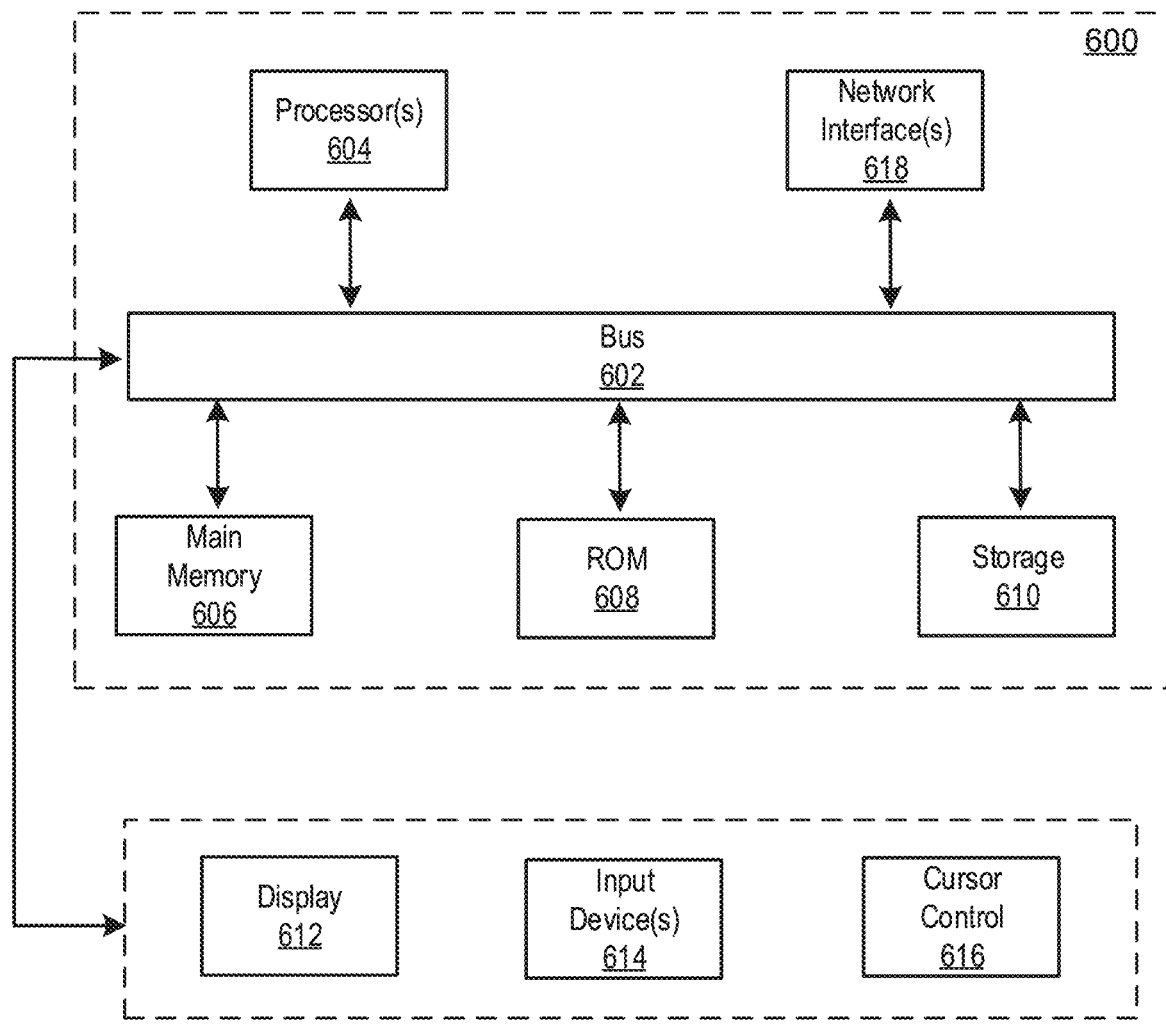
FIG. 6 depicts a block diagram of an example computer system in which any of the embodiments described herein may be implemented.

FIG. 6 depicts a block diagram of an example computer system 600 in which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computer system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for creating and managing a data integration workspace, the system comprising:
   one or more processors; and
   memory storing instructions that, when executed by the one or more processors, cause the system to:
      present a first model and a second model via one or more graphical user interfaces, wherein the first model and the second model are based on a first dataset, the first model comprising a mathematical model and the second model comprising any of a static report and an interactive report;
      receive feedback via a first graphical user interface presenting the first model, wherein the feedback is related to the first model;
      obtain first connection information indicating an association between the first dataset and the first model;
      annotate at least a first column of the first dataset based on the feedback and the first connection information;
   obtain second connection information indicating an association between the first dataset and the second model;
   modify one or more features of the first dataset based on the annotation; and
   responsive to the modification of the one or more features of the first dataset, cause at least the first model and the second model to be automatically updated, wherein the second model is automatically updated responsive to the modification of the one or more features of the first dataset based on the second connection information;
   receive an indication of a subset of models;
   generate a template based on the subset of the models, the template being associated with a first type of user;
   obtain information indicating that a first user is of the first type;
   cause the template to be associated with the first user based on the obtained information; and
   cause the subset of the models to be accessible by the first user based on the association between the first user and the template.

2. The system of claim 1, wherein the system is further caused to:
   identify a connection between the first dataset and a second dataset; and
   cause a visual representation of the connection to be presented via the first graphical user interface.

3. The system of claim 2, wherein the connection comprises a link between a first column of the first dataset and a second column of the second dataset.

4. The system of claim 1, wherein the system is further caused to:
   store an access control list, the access control list defining at least a first security permission associated with the first user;
   receive, via the first graphical user interface, a request to access a third dataset by the first user; and
   restrict access to the third dataset by the first user based on the first security permission, wherein the first security permission indicates that the third dataset is inaccessible by a second user.

5. The system of claim 1, wherein to modify the one or more features of the first dataset based on the annotation, the system is further caused to:
   cause the first dataset and the first model to be displayed simultaneously via a graphical user interface in a split screen view, the split screen view including an indication of the annotation;
   receive input via the graphical user interface, the input indicating one or more modifications to the first dataset; and
   cause the first dataset to be automatically updated in the split screen view based on the input.

6. The system of claim 1, wherein the system is further caused to:
   store a first version of a model, wherein the first version includes one or more modifications to an original version of the model by the first user;
   store a second version of the model, wherein the second version includes one or more modifications to the original version of the model by a second user; and
   cause the original version to be replaced by the first version or the second version in response to an input by the first user or the second user.

7. The system of claim 1, wherein the system is further caused to:
   receive an indication that the first user is scheduled to work on a model based on at least the first dataset;
   obtain permission information associated with the first user, wherein the permission information indicates that the first user is restricted from accessing the first dataset;
   anonymize the first dataset based on the indication that the first user is restricted from accessing the first dataset; and
   cause the anonymized first dataset to be distributed to the first user.

8. A method being implemented by a computing system having one or more processors and non-transitory storage media storing machine-readable instructions that, when executed by the one or more processors, cause the computing system to perform the method, the method comprising:
   presenting a first model and a second model via one or more graphical user interfaces, wherein the first model and the second model are based on a first dataset, the first model comprising a mathematical model and the second model comprising any of a static report and an interactive report;

receiving feedback via a first graphical user interface presenting the first model, wherein the feedback is related to the first model;

obtaining first connection information indicating an association between the first dataset and the first model;

annotating at least a first column of the first dataset based on the feedback and the first connection information;

obtaining second connection information indicating an association between the first dataset and the second model;

modifying one or more features of the first dataset based on the annotation; and responsive to the modification of the one or more features of the first dataset, causing at least the first model and the second model to be automatically updated, wherein the second model is automatically updated responsive to the modification of the one or more features of the first dataset based on the second connection information;

receiving an indication of a subset of models;

generating a template based on the subset of the models, the template being associated with a first type of user;

obtaining information indicating that a first user is of the first type;

causing the template to be associated with the first user based on the obtained information; and causing the subset of the models to be accessible by the first user based on the association between the first user and the template.

9. The method of claim 8, the method further comprising:

identifying a connection between the first dataset and a second dataset; and causing a visual representation of the connection to be presented via the first graphical user interface.

10. The method of claim 9, wherein the connection comprises a link between a first column of the first dataset and a second column of the second dataset.

11. The method of claim 8, the method further comprising:

storing an access control list, the access control list defining at least a first security permission associated with the first user;

receiving, via the first graphical user interface, a request to access a third dataset by the first user; and restricting access to the third dataset by the first user based on the first security permission, wherein the first security permission indicates that the third dataset is inaccessible by a second user.

12. The method of claim 8, wherein modifying the one or more features of the first dataset based on the annotation comprises:

causing the first dataset and the first model to be displayed simultaneously via a graphical user interface in a split screen view, the split screen view including an indication of the annotation;

receiving input via the graphical user interface, the input indicating one or more modifications to the first dataset; and causing the first dataset to be automatically updated in the split screen view based on the input.

13. The method of claim 8, the method further comprising:

storing a first version of a model, wherein the first version includes one or more modifications to an original version of the model by the first user;

storing a second version of the model, wherein the second version includes one or more modifications to the original version of the model by a second user; and causing the original version to be replaced by the first version or the second version in response to an input by the first user or the second user.

14. The method of claim 8, the method further comprising:

receiving an indication that the first user is scheduled to work on a model based on at least the first dataset;

obtaining permission information associated with the first user, wherein the permission information indicates that the first user is restricted from accessing the first dataset;

anonymizing the first dataset based on the indication that the first user is restricted from accessing the first dataset; and causing the anonymized first dataset to be distributed to the first user.

* * * * *